May 5, 1953 D. R. BORST 2,637,341
FLUID PRESSURE CONTROL VALVE DEVICE
Filed July 27, 1949
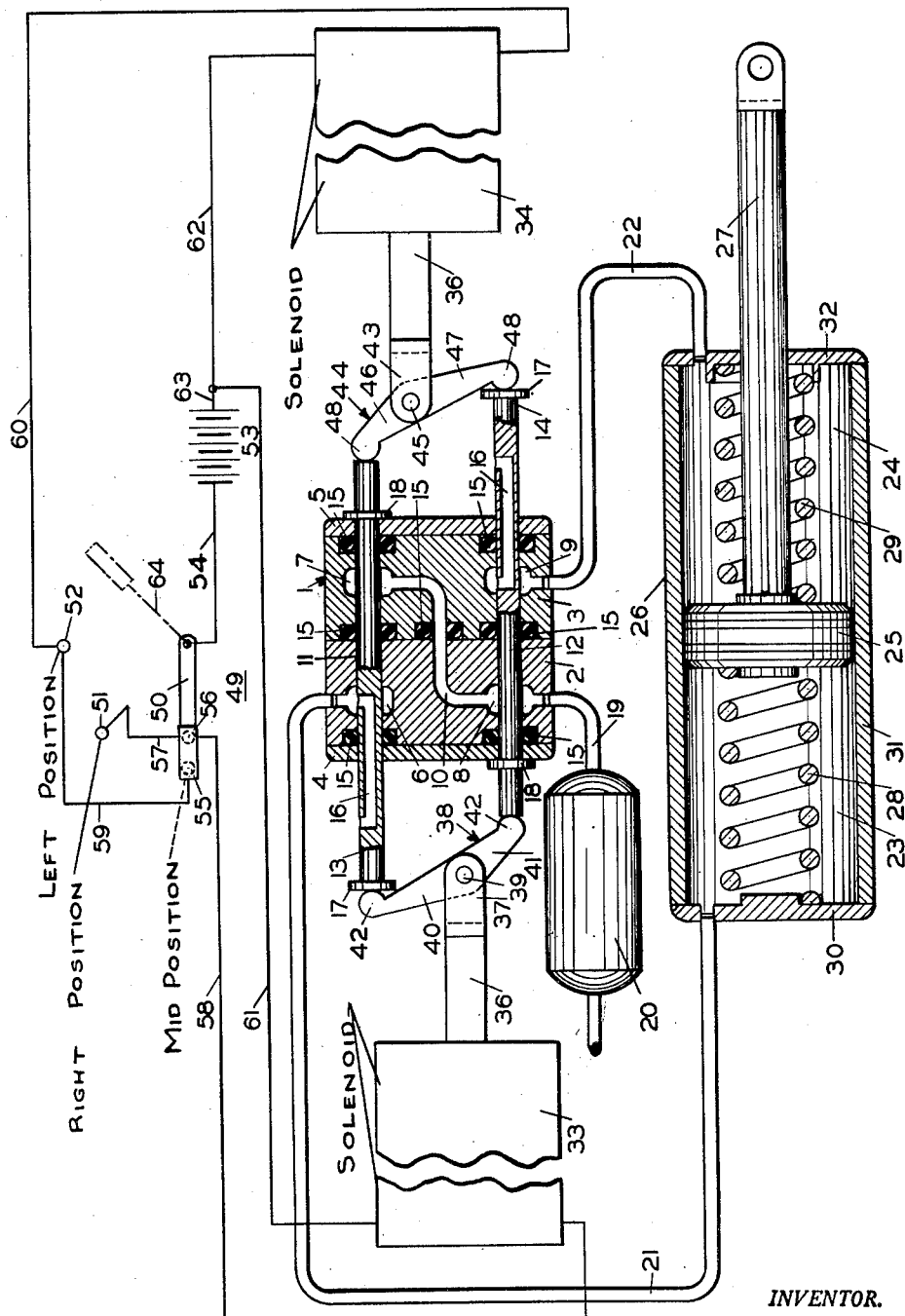
INVENTOR.
DOUGLAS R. BORST
BY
Frank E. Miller,
ATTORNEY Patented May 5, 1953

2,637,341

UNITED STATES PATENT OFFICE 2,637,341

FLUID PRESSURE CONTROL VALVE DEVICE

Douglas R. Borst, Pitcairn, Pa., assignor to Westinghouse Air Brake Company, a corporation of Pennsylvania Application July 27, 1949, Serial No. 107,043

7 Claims. (Cl. 137—623)

This invention relates to control valve devices for controlling operation of a double acting fluid motor or the like and more particularly to a control valve device of the solenoid operated type.

One object of the invention is to provide an improved control valve device of the above type.

Another object of the invention is the provision of a control valve device of the above type for controlling the position of a device such as a double acting piston and so constructed and arranged as to release fluid under pressure from either side of the piston prior to supplying fluid under pressure to the opposite side, and to also release fluid under pressure from both sides of the piston at the same time, if such is desired.

Other objects and advantages will be apparent from the following more detailed description of the invention.

In the accompanying drawing, the single figure is a diagrammatic view, mainly in section, of a solenoid operated control valve device embodying the invention.

Description

As shown in the drawing, the solenoid operated control valve device 1 comprises two casing sections 2 and 3 and two covers 4 and 5 arranged as shown in the drawing and fastened together in any suitable manner (not shown), and embodying therein four chambers 6, 7, 8 and 9, the chambers 7 and 8 being connected by a passageway 10 formed in said casing sections. The chambers 6 and 7 are connected by a bore 11 extending longitudinally through the casing sections 2 and 3 and also through the covers 4 and 5. The chambers 8 and 9 are connected by a bore 12 arranged in spaced apart parallel relation to the bore 11 and also extending through the casing sections 2 and 3 and the covers 4 and 5. Slidably mounted in the bores 11 and 12 are two identical but reversely arranged valve members 13 and 14, respectively, the peripheral surface of each of which is in sealing and sliding contact with three gasket rings 15 disposed and clamped between the casing sections 2 and 3 and between said casing sections and the covers 4 and 5, respectively, as shown in the drawing. These gasket rings 15 are made of rubber or some other resilient material, and the bores therein for receiving the valve members may be made slightly less in diameter than the outside diameter of the valve members which they engage so as to cause said rings to exert a chosen degree of force on the peripheral surface of the valve members 13 and 14 to maintain said members in any position to which they may be moved, by means hereinafter described.

The valve members 13 and 14 are each provided with a passageway 16 extending through a portion of their length and opening at each end to the peripheral surface thereof. The length of the passageway 16 in valve member 13 is such as to connect chamber 6 to atmosphere in the position of said member in which it is shown in the drawing and, in another position of said member, to connect said chamber to chamber 7. The length of the passageway 16 in valve member 14 is such as to connect chamber 9 to atmosphere in the position of said member in which it is shown in the drawing and in another position of said member to connect said chamber to chamber 8. Each of the valve members 13 and 14 may be provided with stops in the form of two collars 17 and 18 for contact with covers 4 and 5, to limit, by engagement with said covers, movement of said members in opposite directions.

The chambers 7 and 8, connected by passageway 10, are connected through a pipe 19 with a fluid pressure storage reservoir 20 which may be charged with fluid under pressure by a suitable air compressor or other means (not shown).

The chambers 6 and 9 are connected by pipes 21 and 22 to two chambers 23 and 24, formed respectively, at opposite sides of a power piston 25 of a double acting fluid motor 26. A piston rod 27 connected to the power piston 25 extends through the chamber 24 to the exterior of the motor and may be connected to a clutch or any other device (not shown) the positioning of which it is desired to control. Two identical bias springs 28 and 29 are disposed in chambers 23 and 24, respectively. One end of the spring 28 bears against the left hand face of piston 25, while the opposite end bears against the right hand face of a pressure head 30 secured to the left hand end of a cylinder portion 31 of the fluid motor 26 in any suitable manner (not shown), to bias said piston in the direction of the right hand. The spring 29 is disposed around piston rod 27 and one end bears against the right hand face of piston 25, while the opposite end bears against the left hand face of a pressure head 32 secured to the right hand end of cylinder portion 31 in any suitable manner (not shown), to bias said piston in the direction of the left hand. In the absence of fluid under pressure in chambers 23 and 24, the springs 28 and 29 serve to bias the piston 25 to a position midway between the ends of the cylinder portion 31.

For operating the valve members 13 and 14 a pair of solenoids 33 and 34 are provided, said solenoids being oppositely arranged with one adjacent each of the covers 4 and 5, and each comprises an armature 36 arranged parallel to and with its outer end disposed substantially between said valve members. The outer end of armature 36 of the solenoid 33 is in the form of a clevis 37 to which a lever 38 is pivotally connected intermediate its ends by a pin 39 dividing lever 38 into two arms 40 and 41 of unequal lengths. Each of the arms 40 and 41 is provided at one end thereof with a button 42 for, respectively, engaging the left hand end of valve members 13 and 14. The outer end of stem 36 of the solenoid 34 is in the form of a clevis 43 to which a lever 44 is pivotally connected intermediate its ends by a pin 45 dividing lever 44 into two arms 46 and 47 of unequal length. Each of the arms 46 and 47 is provided at one end thereof with a button 48 for, respectively, engaging the right hand end of valve members 13 and 14.

The operation of the solenoids 33 and 34 may be controlled by a manually operable switch device 49. The switch device 49 comprises a movable contact 50 for electrically connecting either of two fixed contacts 51 and 52 to one terminal of any suitable source of electrical energy such as a storage battery 53 connected to said movable contact by a lead 54, or for simultaneously connecting two fixed contacts 55 and 56 to said one terminal. The fixed contact 51 is connected to the fixed contact 56 by a lead 57 and the fixed contact 56 is connected to one terminal of solenoid 33 by a lead 58 to provide for energizing solenoid 33 upon moving contact 50 into engagement with either of the fixed contacts 51 or 56. The fixed contact 55 is connected to the fixed contact 52 by a lead 59 and the fixed contact 52 is connected to one terminal of solenoid 34 by a lead 60 to provide for energizing solenoid 34 upon moving contact 50 into engagement with either of the fixed contacts 52 or 55. The opposite terminals of solenoids 33 and 34 are connected by leads 61 and 62 respectively, to a lead 63 which is connected to the other terminal of the storage battery 53.

*Operation*

In operation, let it be assumed that the reservoir 20 is charged with fluid at a desired pressure and the movable contact 50 occupies the position in which it is shown in the drawing in contact with both contacts 55 and 56 whereby both solenoids 33 and 34 will be energized.

With solenoids 33 and 34 energized, the valve members 13 and 14 will be in the position in which they are shown in the drawing, for reasons which will be later described. In this position of the valve members 13 and 14 each of the chambers 23 and 24 of the fluid motor 26 will be vented to atmosphere through the pipes 21 and 22, chambers 6 and 9 respectively, and the passageway 16 in the respective valve members 13 and 14. With the chambers 23 and 24 thus vented of fluid under pressure, the springs 28 and 29 will bias the power piston 25 to a position equidistant from the ends of the cylinder portion 31 in which position said piston is shown in the drawing.

With the valve members 13 and 14 and the power piston 25 in the position in which they are shown in the drawing, let it be assumed that an operator desires to effect movement of said piston 25 and the rod 27 in the direction of the right hand to operate the clutch or other device connected to said rod. To effect movement of piston 25 and rod 27 in the direction of the right hand, the operator will move the movable contact 50 from the position in which it is shown in the drawing to a position in which said contact 50 engages only the fixed contact 51 whereby the circuit for energizing solenoid 34 will be interrupted, but the circuit including battery 53 for energizing solenoid 33 will be maintained. When the solenoid 33 is thus energized, with solenoid 34 deenergized, the armature 36 of solenoid 33 will be displaced in the direction of the right hand thereby rocking lever 38 clockwise about the left hand end of the valve member 14, said member being restrained from movement in the direction of the right hand at this time by the engagement of collar 18 of said member with cover 4. This rocking of the lever 38 about the left hand end of the valve member 14 is effective to move the button 42 at the opposite end of said lever and the valve member 13 in the direction of the right hand until the collar 17 of the valve member 13 engages the cover 4, said button having sliding engagement with said collar during this movement. Upon the collar 17 of the valve member 13 engaging the cover 4, the passageway 16 in said member will be disposed in a position in which it will establish a fluid pressure communication between the chambers 6 and 7 whereupon fluid pressure will flow from chamber 7 by way of said passageway, chamber 6, and through the pipe 21 to the chamber 23 of the double acting fluid motor 26.

With fluid under pressure released from the chamber 24 through pipe 22, chamber 9, and passageway 16 in valve member 14, as has been explained above, the fluid under pressure supplied to the chamber 23 in the fluid motor 26 will then be effective to displace the piston 25 in the direction of the right hand against the force of spring 29 to a position which may be defined by said spring 29 becoming compressed solid, to thereby operate the clutch or other device connected to the piston rod 27.

If now the operator desires to effect movement of the piston 25 of the fluid motor 26 in the direction of the left hand from the position described in the preceding paragraph, to a position at the opposite side of its neutral position, he will move the movable contact 50 to the position in which said contact 50 engages the fixed contact 52. In this new position of movable contact 50, the circuit for energizing solenoid 33 will be interrupted and a circuit completed through solenoid 34. When the solenoid 34 is thus energized, and with solenoid 33 deenergized, the armature 36 of solenoid 34 will be displaced in the direction of the left hand. As has been explained hereinbefore, the arms 46 and 47 of lever 44 are of unequal length. Therefore, as armature 36 of solenoid 34 moves in the direction of the left hand, button 48 on the longer arm 47 will fulcrum on the collar 17 on the right hand end of the valve member 14 whereupon the armature 36 of said solenoid will be effective to rock the lever 44 counterclockwise about said fulcrum and displace the valve member 13 in the direction of the left hand until the collar 18 on said valve member 13 engages the cover 5. In this position of the valve member 13 the passageway 16 therein will interrupt the fluid pressure communication between the chamber 7 and the chamber 23 in the fluid motor 26 and establish a fluid pressure communication between the chamber 6 and atmosphere through said passageway whereby said chamber 23 will be vented. Upon the engagement of collar 18 of the valve member 13 with the cover 5, the button 48 on the shorter arm 46 of lever 44 will fulcrum on the right hand end of said valve member whereupon further displacement of the armature 36 of the solenoid 34 in the direction of the left hand will rock said lever clockwise about said fulcrum and displace the valve member 14 in the direction of the left hand until the collar 17 on said member engages the cover 5. Upon the collar 17 of the valve member 14 engaging the cover 5, the passageway 16 in said member will be disposed in a position in which it will establish a fluid pressure communication between the chambers 8 and 9, whereupon fluid under pressure from chamber 8 will flow to chamber 9 and through the pipe 22 to the right hand face of the piston 25.

With fluid under pressure released from the chamber 23 as has been explained above, the fluid under pressure supplied to the chamber 24 in the fluid motor 26 will then be effective to displace the piston 25 in the direction of the left hand to a position which may be defined by the spring 28 being compressed solid, to thereby operate the clutch or other device connected to the piston rod 27 from the position it previously occupied to a new position in which said piston and rod are displaced to the left of the position in which they are shown in the drawing.

With the valve members 13 and 14 occupying their left hand position in which the collar 18 of valve member 13 and collar 17 of valve member 14 engage the cover 5, and the piston 25 occupying the position defined by the solid height of spring 28, let it be supposed that the operator now desires to operate the piston 25 back to the position defined by the solid height of spring 29.

To effect movement of piston 25 and rod 27 to the last mentioned position, the operator will move the movable contact 50 into engagement with the fixed contact 51 for energizing solenoid 33 while permitting deenergization of solenoid 34. When the solenoid 33 is thus energized the armature 36 thereof will be displaced in the direction of the right hand. The arm 41 of the lever 38 is shorter than the arm 40, as has been hereinbefore explained. Therefore the button 42 on arm 40 will fulcrum on the collar 17 on the left hand end of the valve member 13, whereupon the armature 36 of solenoid 33 will be effective to rock said lever 38 counterclockwise about said fulcrum and thereby displace the valve member 14 in the direction of the right hand until the collar 18 on the valve member 14 engages the cover 4. The valve member 14 now occupies the position in which it is shown in the drawing in which the passageway 16 therein will interrupt the fluid pressure communication between the chamber 8 and the chamber 24 in the fluid motor 26 and establish a fluid pressure communication between the chamber 9 and atmosphere through said passageway whereby said chamber 24 is vented. Upon the engagement of the collar 18 of the valve member 14 with the cover 4, the button 42 on the arm 41 of lever 38 of the solenoid 33 will fulcrum on said collar whereupon further displacement of the armature 36 of the solenoid 33 in the direction of the right hand will rock said lever clockwise about said fulcrum and displace the valve member 13 in direction of the right hand until the collar 17 on said member engages the cover 4. Upon the collar 17 of the valve member 13 engaging the cover 4, the passageway 16 in said member will again be disposed in a position in which it will establish a fluid pressure communication between the chambers 6 and 7, whereupon fluid under pressure present in the chamber 7 will be permitted to flow from said chamber by the way of said passageway in said member, chamber 6 and through the pipe 21 to the left hand face of the piston 25.

With fluid under pressure released from the chamber 24 in the manner explained above, the fluid under pressure supplied to the left hand face of the piston 25 will be effective to displace said piston in the direction of the right hand to thereby operate the clutch or other device connected to the piston rod 27 to the position opposite that to which it was operated when fluid under pressure was supplied only to the chamber 24.

From the foregoing description it is apparent that an operator may effect the operation of the clutch or other device connected to the piston rod 27 from one position to the other position by merely moving the movable contact 50 into engagement with the one or the other of the fixed contacts 51 and 52.

If the operator desires to do so, he may effect venting of both chambers 23 and 24 of the fluid motor 26 at the same time, whereupon the springs 28 and 29 will move the piston 25 and the piston rod 27 to the position in which they are shown in the drawing.

In order to vent both chambers 23 and 24 to atmosphere, the operator will move the movable contact 50 into the position in which said contact engages the fixed contacts 55 and 56 in which position said movable contact 50 is shown in the drawing. Upon the movable contact 50 engaging the fixed contacts 55 and 56 both solenoids 33 and 34 will be energized through circuits previously described.

Regardless of the position of valve members 13, 14 and piston 25 previous to this energization of both solenoids, the force applied by such energization to the levers 38 and 44 will, through the shorter arms 41, 46 thereof, exceed the opposing force acting on the ends of their longer arms 40, 47 respectively, and thereby turn both of said levers in a counterclockwise direction and move the valve members 13, 14 to the position in which they are shown in the drawing, if not already so positioned, whereby both chambers 23 and 24 will be vented to atmosphere, and springs 28 and 29 will move the power piston 25 and piston rod 27 to the position in which they are shown in the drawing.

Let it be assumed that, prior to simultaneously energizing both solenoids 33 and 34, the solenoid 33 was energized and the valve members 13, 14 occupied their extreme right hand position. Upon moving contact 50 into engagement with the contacts 55 and 56, the armature 36 of solenoid 34 will be displaced in the direction of the left hand. As the force applied to the left hand end of valve member 13 acting through long lever arm 40 is less than the force applied to the right hand end of said valve member by solenoid 34 acting through short lever arm 46, and the force applied to the left hand end of valve member 14 by solenoid 33 acting through short lever arm 41 is greater than the force applied to the right hand end of said member 14 by solenoid 34 acting through long lever arm 47, the valve member 14 will remain stationary and the valve member 13 will be moved in the direction of the left hand until the collar 18 on valve member 13 engages cover 5 at which time both valve members 13 and 14 will occupy the position in which they are shown in the drawing whereby fluid under pressure present in the chambers 23 and 24 will be vented.

If prior to energization of both solenoids 33 and 34, the valve members 13 and 14 occupied their extreme left hand positions, said energization would cause valve member 14 to move to its extreme right hand position, in which position it is shown in the drawing, while valve member 13 remained stationary since the forces acting on the valve members 13 and 14 are identical and acting in the same directions as described in the preceding paragraph.

As has been hereinbefore explained, the gasket rings 15 exert a force on the valve members 13 and 14 to maintain said members in whatever position to which they may be moved. Therefore, upon the solenoids 33 and 34 moving the valve members 13 and 14 to any desired position, the movable contact 50 may be moved to a position indicated on the drawing by a dot and dash line 64, to thereby deenergize both solenoids 33 and 34 and prevent the unnecessary consumption of electrical energy from the storage battery 53.

Summary

From the foregoing description it will now be seen that I have provided a control device for controlling the operation of a power piston of a double acting fluid motor or the like wherein fluid under pressure may be selectively vented from either face of the piston prior to the supply of fluid under pressure to the other face thereof, or, if desired, it may be vented from both faces of the power piston at the same time to unload the piston and permit its movement to a neutral position midway between two extreme positions.

Having now described my invention, what I claim as new and desire to secure by Letters Patent, is:

1. A control valve device comprising a casing having two pressure chambers constantly supplied with fluid under pressure and also having two other chambers, two valve means each respectively operative, in one position, to establish a fluid pressure communication between one of said pressure chambers and one of said other chambers and, in another position, to establish a fluid pressure communication between said other chamber and atmosphere, two electro-responsive means, means operative by each electro-responsive means upon energization to move first one of said valve means from its said one position to its said other position and then the other of said valve means from its said other position to its said one position, and means for selectively energizing said electro-responsive means.

2. A control device comprising a casing, two shafts slidably mounted in parallel spaced apart relation in said casing and each being movable to two different positions, electro-responsive means comprising a plunger movable by energization of said electro-responsive means, a lever pivoted on said plunger and having two arms of unequal length, the end of the longer arm being operable to fulcrum on one end of one of said shafts upon said movement of said plunger until the other of said shafts is moved from one of said positions to the other of said positions, and the end of the shorter arm being operable to fulcrum on the corresponding end of the other shaft upon said other shaft reaching said other position to render said lever effective to be rocked by said movement of said plunger to move said one shaft from one of its positions to the other of its positions, and means for energizing said electro-responsive means.

3. A control device comprising a casing, two shafts slidably mounted in parallel spaced apart relation in said casing, two collars formed on each of said shafts to limit the movement of said shafts in each direction, two rockable levers the opposite ends of each engaging one end of each of said shafts, a movable plunger pivotally connected to each of said levers intermediate its ends in a manner to effect rocking of the lever in one direction to move one of said shafts the limit of its movement in one direction and, upon said one shaft reaching the limit of its movement in one direction, to effect rocking of said lever in the opposite direction to move said other shaft the limit of its movement in the same direction, and means for moving said plungers to rock said levers.

4. A control device comprising a casing, two shafts slidably mounted in said casing, means cooperative with said shafts for limiting movement of said shafts in opposite directions, two levers one engaging at its opposite ends one end of each of said shafts and the other engaging at its opposite ends the opposite ends of said shafts, respectively, a plunger pivotally connected to each of said levers intermediate its ends to form two arms of unequal length, and means for moving each of said plungers in one direction to cause the end of the longer arm of the respective lever to fulcrum on the end of the respective shaft to rock said lever in a direction to move the other of said shafts to the limit of its movement in one direction, and upon such shaft reaching the limit of its movement, to cause the end of the shorter arm of the respective lever to fulcrum on the end of the other shaft to rock the respective lever in the opposite direction to move said other shaft to the limit of its movement in said one direction.

5. A control mechanism comprising first and second movable elements each having two extreme positions, a first lever connected at opposite ends to, respectively, said first and second elements and operable to move both of said elements in one direction to one of said extreme positions, a second lever connected at opposite ends to, respectively, said two elements and operable to move said elements in the opposite direction to their other extreme positions, a first plunger pivotally connected to said first lever at a point unequidistant from the ends of said first lever, a second plunger pivotally connected to said second lever at a point unequidistant from the ends of said second lever, and two electro-responsive means one for moving each of said plungers in a direction opposite to the direction of movement imparted to the other plunger by the other electro-responsive means.

6. A control mechanism comprising a source of fluid under pressure, two pipes, a first valve means operable in a first position to supply fluid under pressure from said source to one of said pipes and operable in a second position to vent fluid under pressure from said one pipe, a second valve means operable in a first position to supply fluid under pressure from said source to the other of said pipes and operable in a second position to vent fluid under pressure from said other pipe, a first solenoid having a plunger, a second solenoid having a plunger, a first lever connected at opposite ends to, respectively, one end of said first and second valve means and at a point unequidistant from the ends thereof to the plunger of said first solenoid and operable by said first solenoid upon energization thereof to move said valve means sequentially in one direction to their respective first and second positions, a second lever connected at opposite ends to, respectively, the opposite ends of said first and second valve means and at a point unequidistant from the ends thereof to the plunger of said second solenoid, and operable by said second solenoid upon energization thereof to move said valve means sequentially in the opposite direction to their respective second and first positions, an electrical circuit for each of the solenoids, and switch means in each solenoid circuit operative to energize either one of said solenoids at one time, or to energize both of said solenoids simultaneously.

7. A control mechanism comprising a source of fluid under pressure, two pipes, two valve means each operable in a first position to supply fluid under pressure from said source to one of said pipes and operable in a second position to vent fluid under pressure from one of said pipes, a first solenoid, a second solenoid, a first lever connected closer to one end than to the other end to said first solenoid and connected at opposite ends to said two valve means and operative upon energization of said first solenoid to effect movement of one of said valve means from its said first position to its said second position prior to movement of the other of said valve means from its said second position to its said first position, a second lever connected closer to one end than the other end to said second solenoid and connected at opposite ends to said two valve means and operative upon energization of said second solenoid to effect movement of said other valve means from its said first position to its said second position prior to movement of said one valve means from its said second position to its said first position, and switch means selectively operable to energize either one of said solenoids independently of the other or to simultaneously energize both of said solenoids, said first and second levers cooperating with said solenoids to move each of said valve means to its said second position upon said simultaneous energization of said solenoids.

DOUGLAS R. BORST.

References Cited in the file of this patent

UNITED STATES PATENTS

| Number | Name | Date |
|---|---|---|
| 465,232 | Aiken | Dec. 15, 1891 |
| 907,985 | Furlow | Dec. 29, 1908 |
| 965,270 | Zelle | July 26, 1910 |
| 1,251,563 | O'Donnell | Jan. 1, 1918 |
| 1,785,658 | Stanley | Dec. 16, 1930 |
| 1,937,077 | West | Nov. 28, 1933 |
| 2,067,363 | Waeschle | Jan. 12, 1937 |
| 2,134,208 | Schofield | Oct. 25, 1938 |
| 2,179,815 | Conklin | Nov. 14, 1939 |